United States Patent
Takahashi et al.

(10) Patent No.: US 8,560,784 B2
(45) Date of Patent: Oct. 15, 2013

(54) MEMORY CONTROL DEVICE AND METHOD

(75) Inventors: Noriyuki Takahashi, Kawasaki (JP); Mikio Hondou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 49 days.

(21) Appl. No.: 13/238,190

(22) Filed: Sep. 21, 2011

(65) Prior Publication Data
US 2012/0079216 A1    Mar. 29, 2012

Related U.S. Application Data

(63) Continuation of application No. PCT/JP2009/001885, filed on Apr. 24, 2009.

(51) Int. Cl.
*G06F 12/00* (2006.01)
*G06F 13/00* (2006.01)
*G06F 13/28* (2006.01)

(52) U.S. Cl.
USPC ............................ 711/158; 711/105; 711/167

(58) Field of Classification Search
USPC .......................................... 711/105, 165, 158
See application file for complete search history.

(56) References Cited

U.S. PATENT DOCUMENTS

| | | | |
|---|---|---|---|
| 8,285,914 B1* | 10/2012 | Venkatramani et al. | 711/5 |
| 2003/0074504 A1 | 4/2003 | Weber | |
| 2005/0289306 A1 | 12/2005 | Muthrasanallur et al. | |
| 2006/0026342 A1 | 2/2006 | Calvignac et al. | |
| 2007/0156946 A1* | 7/2007 | Lakshmanamurthy et al. | 711/5 |
| 2007/0294471 A1 | 12/2007 | Calvignac et al. | |

FOREIGN PATENT DOCUMENTS

| | | |
|---|---|---|
| JP | 4-237347 | 8/1992 |
| JP | 6-161941 | 6/1994 |
| JP | 11-272567 | 10/1999 |
| JP | 2004-310394 | 11/2004 |
| JP | 2005-505854 | 2/2005 |
| JP | 2005-173859 | 6/2005 |
| JP | 2008-503808 | 2/2008 |
| WO | 03/034238 A1 | 4/2003 |

OTHER PUBLICATIONS

Extended European Search Report issued Sep. 13, 2012 in corresponding European Patent Application No. 09843607.4.
International Search Report for PCT/JP2009/001885, mailed Jan. 19, 2010.

* cited by examiner

*Primary Examiner* — Michael Alsip
(74) *Attorney, Agent, or Firm* — Staas & Halsey LLP

(57) ABSTRACT

A priority control register 104 dynamically controls the internal transition state based on the issuability state of a memory request obtained in the memory request issuability signal generation unit 106 and retaining state of the memory request in the REQ_BUF 102 obtained by each of determination circuits 105 #2 through #5. Thus, the jump control of the priorities corresponding to the access regulation of the DRAM module 109 can be realized.

10 Claims, 11 Drawing Sheets

FIG. 5

| REGISTER NAME | PRIORITY WHEN VALUE = 0 | PRIORITY WHEN VALUE = 1 |
|---|---|---|
| PRIORITY CONTROL REGISTER_01 | REQ_BUF0 > REQ_BUF1 | REQ_BUF0 < REQ_BUF1 |
| PRIORITY CONTROL REGISTER_02 | REQ_BUF0 > REQ_BUF2 | REQ_BUF0 < REQ_BUF2 |
| PRIORITY CONTROL REGISTER_03 | REQ_BUF0 > REQ_BUF3 | REQ_BUF0 < REQ_BUF3 |
| PRIORITY CONTROL REGISTER_12 | REQ_BUF1 > REQ_BUF2 | REQ_BUF1 < REQ_BUF2 |
| PRIORITY CONTROL REGISTER_13 | REQ_BUF1 > REQ_BUF3 | REQ_BUF1 < REQ_BUF3 |
| PRIORITY CONTROL REGISTER_23 | REQ_BUF2 > REQ_BUF3 | REQ_BUF2 < REQ_BUF3 |

| | | 1 | 2 | 3 | 4 | 5 | 6 | 7 | 8 |
|---|---|---|---|---|---|---|---|---|---|
| (a) | CYCLE NUMBER | | | | | | | | |
| (b) | valid DETERMINATION CIRCUIT 1 [OUTPUT OF SELECTOR] | ○ | × | × | × | × | × | × | ○ |
| (c) | valid DETERMINATION CIRCUIT 2 [REQ_BUF0] | ○ ("1") | × | × | × | × | × | × | × |
| (d) | valid DETERMINATION CIRCUIT 3 [REQ_BUF1] | ○ | × | × | × | × | × | × | ○ |
| (e) | valid DETERMINATION CIRCUIT 4 [REQ_BUF2] | ○ | × | ○ | ○ | ○ | ○ | ○ | ○ |
| (f) | valid DETERMINATION CIRCUIT 5 [REQ_BUF3] | × | × | × | × | × | × | × | × |
| (g) | PRIORITY CONTROL REGISTER_01 | | | | | | | | |
| (h) | PRIORITY CONTROL REGISTER_02 | | | | | | | | |
| (i) | PRIORITY CONTROL REGISTER_03 | | | | | | | | |
| (j) | PRIORITY CONTROL REGISTER_12 | | | | | | | | |
| (k) | PRIORITY CONTROL REGISTER_13 | | | | | | | | |
| (l) | PRIORITY CONTROL REGISTER_23 | | | | | | | | |
| (m) | MEMORY BUS | | BANK0 ACTV | BANK0 WRITE | | | | | |

FIG. 8A

MEMORY CONTROL DEVICE AND METHOD

CROSS-REFERENCE TO RELATED APPLICATION

This application is a continuation of International Application No. PCT/JP2009/001885, filed on Apr. 24, 2009, the entire contents of which are incorporated herein by reference.

FIELD

The present invention relates to a memory control device and method.

BACKGROUND

In memory access control of a multi-bank memory having a plurality of banks such as SDRAM (Synchronous Dynamic Random Access Memory) etc., an arbitration circuit using a priority control register can be used to arbitrate a memory request instruction from a plurality of CPUs and IO devices. In the circuit, a plurality of memory requests are allocated for each requested bank to a queue called a request buffer and are held. Then, the memory requests are read from the respective request buffers in order sequentially from the highest priority based on the priorities of the memory requests stored in a priority control register and are processed. In the control system, when the priority of the memory request of a request buffer becomes the highest and processed, the priority of the request buffer is defined as the lowest priority in the next instruction execution cycle. On the other hand, in the next instruction execution cycle the request buffer from which an instruction has been least recently read becomes the highest priority, and the memory request read from the request buffer is processed. This control system is what is called an LRU (least recently used) control system.

An access regulation is used for the DRAM. The access regulation is a regulation according to which, for example, when a data read request is processed for the DRAM in an instruction execution cycle, and when a data write request (different instruction) is next processed, for example, processes are to be kept waiting for seven cycles. Otherwise, when a data read request is processed on a bank in the DRAM in an instruction execution cycle, and when a data read request (identical instruction) is next processed on another bank, processes are to be kept waiting for two cycles, for example.

Assume that, in the conventional technology of memory access control using the priority control register, a memory request A read from one request buffer selected based on the priorities of the memory requests stored in the priority control register does not satisfy the access regulation of the DRAM. In this case, the process of the memory request A is kept waiting until the instruction execution cycle in which the access regulation is satisfied.

However, in the request buffers not selected based on the priorities of the memory requests stored in the priority control register, there can be a request buffer from which a memory request satisfying an access regulation is read. For example, when the memory request currently being processed is a data read request, and when the memory request selected in the next instruction execution cycle is a data write request, the data write request has to be kept waiting for seven cycles, for example, from the execution start of the data read request. In this example, it is assumed that there is another data read request to the execution bank different from the execution bank of the preceding data read request in the request buffers not selected by the priority control register. In this case, since the wait cycle for an identical instruction can be shorter than the wait cycle for a different instruction, the other data read request described above can be processed after, for example, three cycles from the execution start of the preceding data read request.

In this case, the memory request B which is in another request buffer and satisfies the access regulation cannot be conventionally processed until the memory request A (different instruction) currently being read from the request buffer by the priority control register is processed. That is, in the conventional technology of the memory access control using a priority control register, there is the problem that the efficiency of execution of a memory request is degraded in the case above.

Patent Document 1: Japanese Laid-open Patent Publication No. 6-161941
Patent Document 2: Japanese Laid-open Patent Publication No. 11-272567
Patent Document 3: Japanese Laid-open Patent Publication No. 2005-173859
Patent Document 4: Japanese Laid-open Patent Publication No. 2008-503808

SUMMARY

An aspect of the present invention aims at performing priority control in which a request buffer satisfying the access regulation of a storage device such as DRAM etc. can be assigned a high priority.

In an example of the aspect, a memory control device is connected to a storage device having first and second memory banks corresponding to a processor and a first memory bank, issues a memory access request received from the processor to the storage device, and has the following configuration.

A first request storage unit holds a memory access request to the first memory bank.

A second request storage unit holds a memory access request to the second memory bank.

A decode unit allocates the memory access request received from the processor to the first or second request storage unit according to a bank address bank address included in the memory access request.

A selection unit is connected to the first request storage unit and the second request storage unit, and selects and outputs the memory access request held in the first storage unit or the second request storage unit according to a selection signal.

A first determination circuit outputs a first determination result as to whether or not the memory access request held in the first request storage unit can be issued to the first memory bank depending on the relationship with the memory access request already issued to the first memory bank.

A second determination circuit outputs a second determination result as to whether or not the memory access request held in the second request storage unit can be issued to the second memory bank depending on the relationship with the memory access request already issued to the second memory bank.

A third determination circuit outputs a third determination result as to whether or not the memory access request selected by a selection circuit can be issued to a storage device depending on the relationship with the memory access request already issued to the storage device.

A priority control circuit is connected to the first and second determination circuits, and outputs a selection signal for selection of the memory access request held in the first determination circuit or the memory access request held in the second determination circuit according to the first to third determination results.

With the configuration above, the transition state of the priority can be dynamically controlled based on the already issued memory access request issuability and the retaining state of the memory access request in the request storage unit, thereby performing priority jump control corresponding to the access regulation of the storage device. The control can be realized by a determination circuit having a simple configuration and a priority control circuit also having a simple configuration.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is an explanatory view of the operation of the priority control register;

FIGS. 8A and 8B are a flowchart of the operation according to the conventional technology as compared with an embodiment.

DESCRIPTION OF EMBODIMENTS

An embodiment of the memory control device and method disclosed are described below with reference to the attached drawings.

Figure 1:
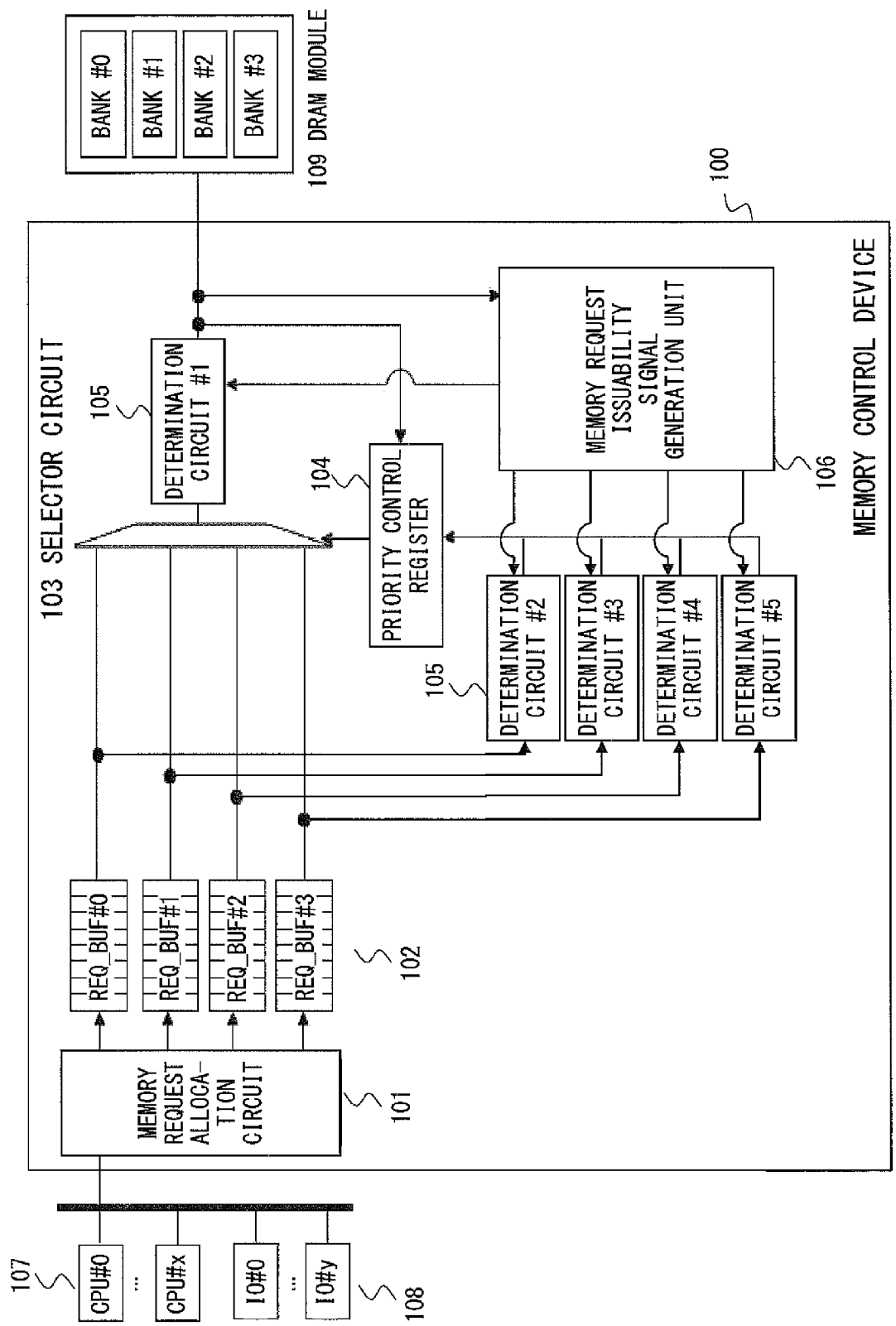
FIG. 1 is a configuration of an embodiment of the memory control device.

FIG. 1 is a configuration of an embodiment of the memory control device.

A memory control device 100 is connected to one or more CPUs 107 (#0~#x) or IO (Input/Output) devices 108 (#0~#y) and one or more DRAM modules 109.

Figure 2:
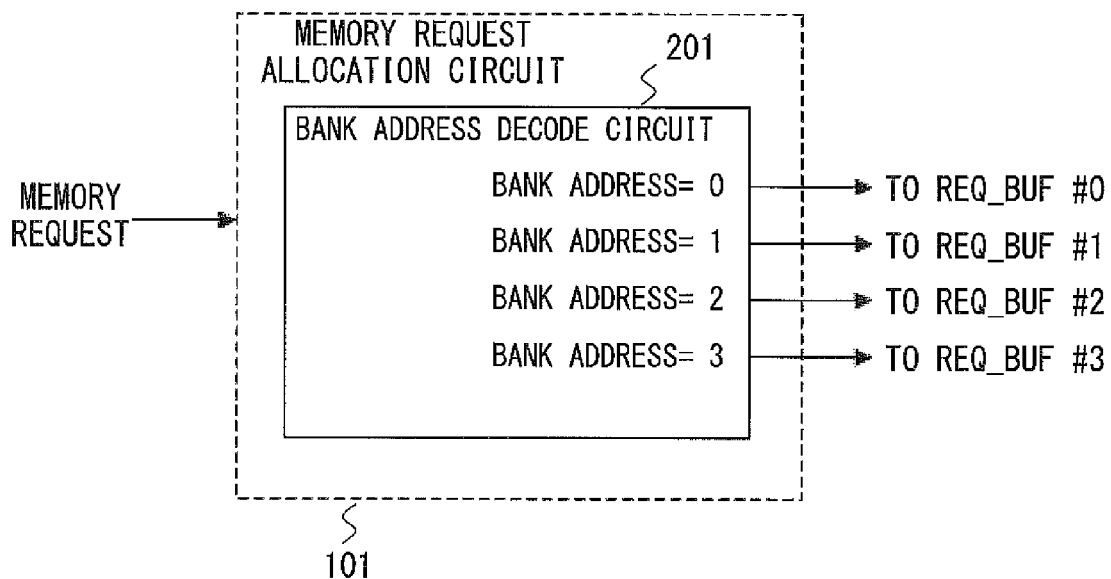
FIG. 2 is a configuration of a memory request allocation circuit.

In the memory control device 100, a memory request allocation circuit 101 includes a bank address decode circuit 201 as illustrated in FIG. 2. The bank address decode circuit 201 receives a memory request for a data read or a data write to the DRAM module 109 from the CPU 107 or the IO device 108 in FIG. 1. The bank address decode circuit 201 selects a destination from a group of N request buffers (REQ_BUF) 102 according to the bank addresses corresponding to N banks configuring the DRAM module 109 recognized from the memory request. Then, the bank address decode circuit 201 sets the memory request in the selected REQ_BUF 102. In the examples in FIGS. 1 and 2, the banks configuring the DRAM module 109 are four banks #0 through #3 (N=4), and correspondingly the REQ_BUF 102 is configured by four buffers #0 through #3. The REQ_BUF 102 is realized by a buffer circuit such as a FIFO (first in first out) etc.

A selector circuit 103 selects the REQ_BUF 102 having the highest priority indicated by a priority control register 104 from among the REQ_BUFs 102 including a memory request.

A determination circuit 105 (#1) checks according to a memory request issuability signal generated by a memory request issuability signal generation unit 106 whether or not the memory request selected by the selector circuit 103 can be issued. Then, the determination circuit 105 (#1) issued the memory request selected by the selector circuit 103 to the DRAM module 109 only when it is determined that the memory request can be issued.

Figure 3:
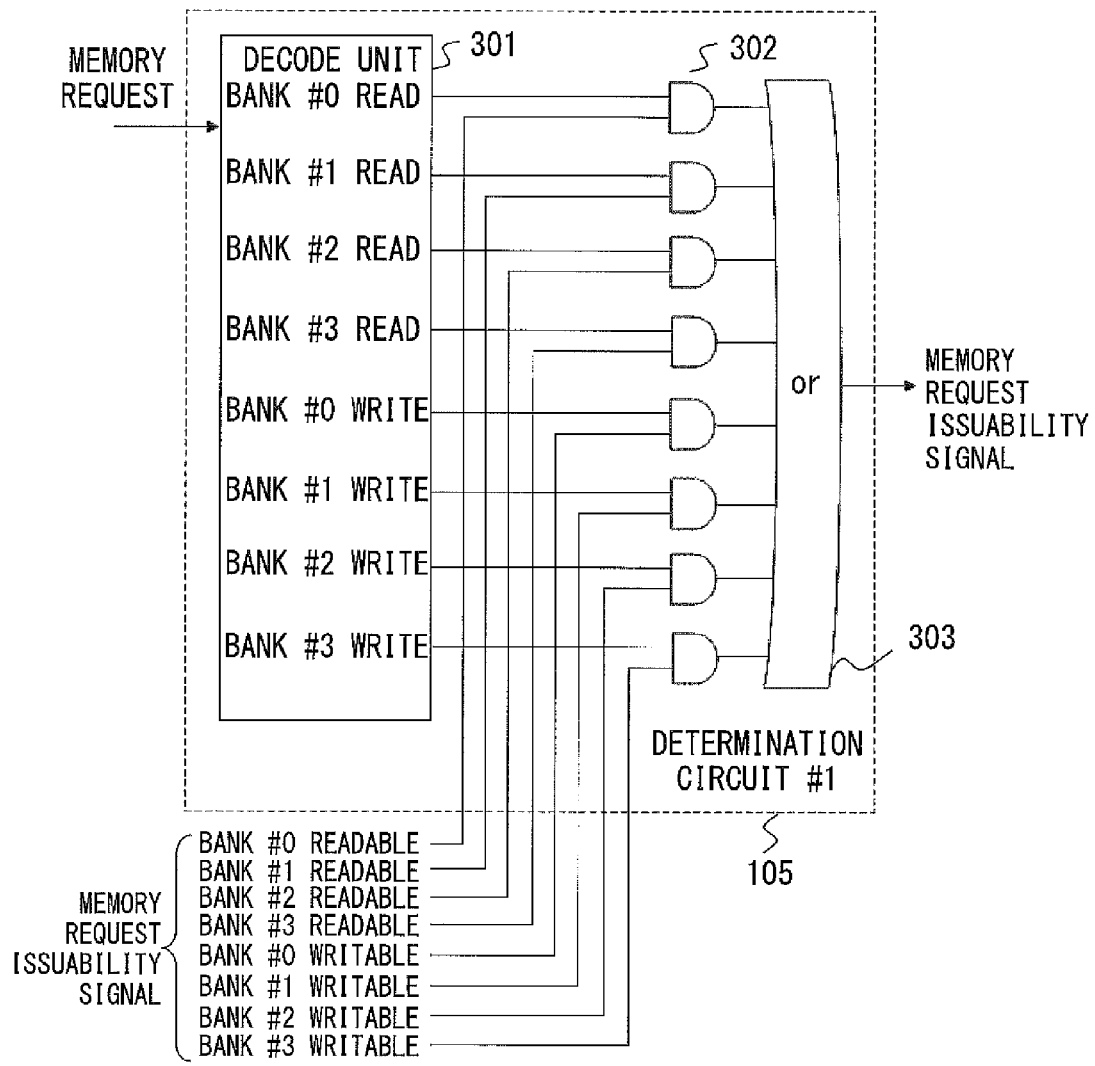
FIG. 3 is an example of a configuration of the determination circuit.

The determination circuit 105 (#1) is realized by a circuit illustrated in, for example, FIG. 3. In FIG. 3, a decode unit 301 decodes the memory request selected by the selector circuit 103. As a result, the decode unit 301 sets to "1" only one of the outputs of bank #0 read, bank #1 read, bank #2 read, bank #3 read, bank #0 write, bank #1 write, bank #2 write, and bank #3 write, and sets the other outputs to "0". That is, the decode unit 301 is 1-hot decoder. For example, when the memory request is a data read request instruction to access the bank #0 of the DRAM module 109, the decode unit 301 sets only the output of the bank #0 read to "1". Similarly, when the memory request is a data write request instruction to access the bank #0 of the DRAM module 109, the decode unit 301 sets only the output of the bank #0 write to "1". The same holds true with other banks.

An AND (logical product) circuit 302 performs an AND logical operation with the bank #0 read and the memory request issuability signal indicating the bank #0 enable output by the memory request issuability signal generation unit 106. Similarly, an AND logical operation is performed on the bank #1 read and the bank #1 readable, the bank #2 read and the bank #2 readable, the bank #3 read and the bank #3 readable, the bank #0 write and the bank #0 writability, the bank #1 write and the bank #1 writability, the bank #2 write and the bank #2 writability, and the bank #3 write and the bank #3 writability. Each AND logical operation result from the AND circuit 302 is output as a memory request issuability signal through an OR (logical sum) circuit 303. The OR circuit 303 performs an OR logical operation on the output of all AND circuits 302. When the memory request issuability signal is output, the determination circuit 105 in FIG. 1 issues the memory request selected by the selector circuit 103 to the DRAM module 109. For example, when the memory request is a bank #0 read instruction, and when the memory request issuability signal generation unit 106 outputs a memory request issuability signal indicating the bank #0 enable, a memory request issuability signal is output. On the other hand, when the memory request is a bank #0 read instruction, and when the memory request issuability signal generation unit 106 does not output a memory request issuability signal indicating the bank #0 enable, a memory request issuability signal is not output. The same holds true with other banks and data write request instruction.

The determination circuits 105 #2 through #5 illustrated in FIG. 1 have almost the same functions as the determination circuit 105 (#1) illustrated in FIG. 3, and have to monitor only the memory requests of the respective banks. For example, the determination circuit 105 (#2) monitors whether or not the bank #0 read or the bank #0 write is output from the REQ_BUF 102 (#0), and outputs a memory request issuability signal about the bank #0 if the bank #0 readable or the bank #0 writable is input from the memory request issuability signal generation unit 106. The determination circuit 105 (#3)

monitors whether or not the bank #1 read or the bank #1 write is output from the REQ_BUF 102 (#1), and outputs a memory request issuability signal about the bank #1 if the bank #1 readable or the bank #1 writable is input from the memory request issuability signal generation unit 106. The determination circuit 105 (#4) monitors whether or not the bank #2 read or the bank #2 write is output from the REQ_BUF 102 (#2), and outputs a memory request issuability signal about the bank #2 if the bank #2 readable or the bank #2 writable is input from the memory request issuability signal generation unit 106. The determination circuit 105 (#5) monitors whether or not the bank #3 read or the bank #3 write is output from the REQ_BUF 102 (#3), and outputs a memory request issuability signal about the bank #3 if the bank #3 readable or the bank #3 writable is input from the memory request issuability signal generation unit 106.

Figure 4:
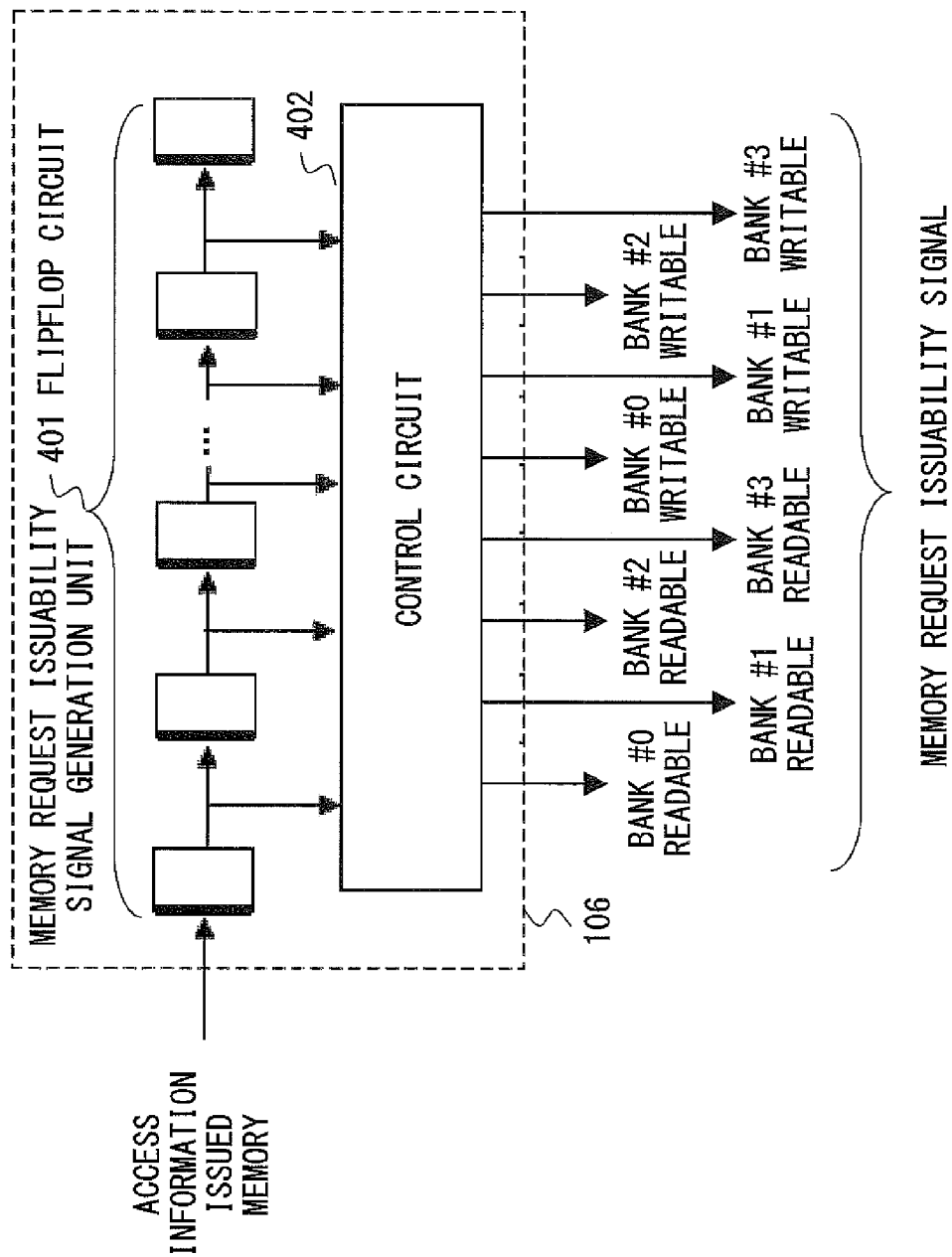
FIG. 4 is an example of a configuration of the memory request issuability signal generation unit.

The memory request issuability signal generation unit 106 in FIG. 1 is realized by, for example, the circuit illustrated in FIG. 4. In FIG. 4, a multi-stage flip-flop circuit 401 sequentially holds issued memory access information (issued memory requests). The number of the stages of the flipflop circuit 401 corresponds to the number of held pieces of issued memory access information whose access regulations of the DRAM module 109 can be determined. The control circuit 402 determines the access regulations of the DRAM module 109 based on the issued memory access information group held in the flipflop circuit 401. As a result, the control circuit 402 outputs the memory request issuability signals of the bank #0 readable, bank #1 readable, bank #2 readable, bank #3 readable, bank #0 writable, bank #1 writable, bank #2 writable, and bank #3 writable. For example, assume that the memory request issued to the current DRAM module 109 is a data read request to the bank #0. In this case, each memory request issuability signal of the bank #0 writable, bank #1 writable, bank #2 writable, and bank #3 writable becomes "1", for example, seven cycles after the current instruction execution cycle. In addition, each memory request issuability signal of the bank #1 readable, bank #2 readable, and bank #3 readable becomes "1", for example, two cycles after the current instruction execution cycle. The control circuit 402 executes the algorithm of such access regulations.

The priority control register 104 in FIG. 1 operates as follows based on the output of each of the determination circuits 105 #1 through #5.

First, when the determination circuit 105 issues to the DRAM module 109 the memory request read from the REQ_BUF 102 selected by the selector circuit 103, the priority control register 104 updates the internal transition state such that the priority of the REQ_BUF 102 becomes the lowest in the next cycle.

In addition, when any of the determination circuits 105 #2 through #5 determines that the memory request can be issued to any of the REQ_BUF 102 #0 through #3, the priority control register 104 updates the internal transition state such that the priority of the REQ_BUF 102 becomes higher.

As illustrated in FIG. 5, the priority control register 104 includes six circuits, a priority control register_01, a priority control register_02, a priority control register_03, a priority control register_12, a priority control register_13, and a priority control register_23, which configure the priority control register 104.

The priority control register_01 holds the priorities of the REQ_BUF 102 (#0) and the REQ_BUF 102 (#1). As illustrated in FIG. 5, when the value held by the priority control register_01 is "0", it indicates that the priority of the REQ_BUF 102 (#0) is higher than the priority of the REQ_BUF 102 (#1). When the value held by the priority control register_01 is "1", it indicates that the priority of the REQ_BUF 102 (#1) is higher than the priority of the REQ_BUF 102 (#0).

The priority control register_02 holds the priorities of the REQ_BUF 102 (#0) and the REQ_BUF 102 (#2). As illustrated in FIG. 5, when the value held by the priority control register_02 is "0", it indicates that the priority of the REQ_BUF 102 (#0) is higher than the priority of the REQ_BUF 102 (#2). When the value held by the priority control register_02 is "1", it indicates that the priority of the REQ_BUF 102 (#2) is higher than the priority of the REQ_BUF 102 (#0).

The priority control register_03 holds the priorities of the REQ_BUF 102 (#0) and the REQ_BUF 102 (#3). As illustrated in FIG. 5, when the value held by the priority control register_03 is "0", it indicates that the priority of the REQ_BUF 102 (#0) is higher than the priority of the REQ_BUF 102 (#3). When the value held by the priority control register_03 is "1", it indicates that the priority of the REQ_BUF 102 (#3) is higher than the priority of the REQ_BUF 102 (#0).

The priority control register_12 holds the priorities of the REQ_BUF 102 (#1) and the REQ_BUF 102 (#2). As illustrated in FIG. 5, when the value held by the priority control register_12 is "0", it indicates that the priority of the REQ_BUF 102 (#1) is higher than the priority of the REQ_BUF 102 (#2). When the value held by the priority control register_12 is "1", it indicates that the priority of the REQ_BUF 102 (#2) is higher than the priority of the REQ_BUF 102 (#1).

The priority control register_13 holds the priorities of the REQ_BUF 102 (#1) and the REQ_BUF 102 (#3). As illustrated in FIG. 5, when the value held by the priority control register_13 is "0", it indicates that the priority of the REQ_BUF 102 (#1) is higher than the priority of the REQ_BUF 102 (#3). When the value held by the priority control register_13 is "1", it indicates that the priority of the REQ_BUF 102 (#3) is higher than the priority of the REQ_BUF 102 (#1).

The priority control register_23 holds the priorities of the REQ_BUF 102 (#2) and the REQ_BUF 102 (#3). As illustrated in FIG. 5, when the value held by the priority control register_23 is "0", it indicates that the priority of the REQ_BUF 102 (#2) is higher than the priority of the REQ_BUF 102 (#3). When the value held by the priority control register_23 is "1", it indicates that the priority of the REQ_BUF 102 (#3) is higher than the priority of the REQ_BUF 102 (#2).

The priority control register 104 compares the priorities obtained by the six priority control registers above with each other, thereby determining the REQ_BUF 102 having the highest priority, and notifies the selector circuit 103 of the information. The selector circuit 103 selects the memory request output from the notified REQ_BUF 102.

Figure 6:
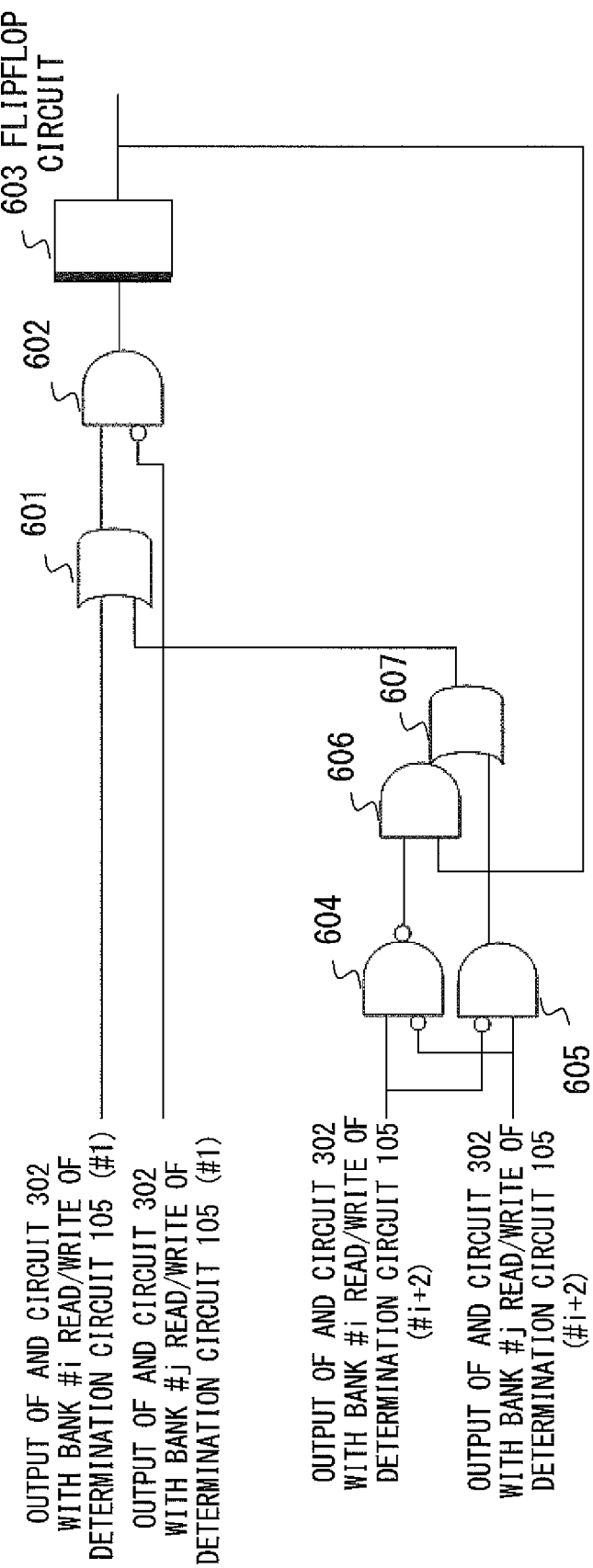
FIG. 6 is an example of a configuration of a circuit of the priority control register.

FIG. 6 is an example of the circuit configuration realizing the circuits of the priority control register_01, the priority control register_02, the priority control register_03, the priority control register_12, the priority control register_13, and the priority control register_23. Assume that a certain priority control register is a priority control register_ij. That is, the combination of i and j is (01), (02), (03), (12), (13), and (23). FIG. 6 is an example of realizing the priority control register_ij.

In FIG. 6, input as the first input of an OR circuit 601 is the output obtained by performing an OR logical operation on the output of the AND circuit 302 input by the bank #i read of the determination circuit 105 (#1) having the configuration example illustrated in FIG. 3 and the output of the AND circuit 302 input by the bank #i write. input as the second input of the OR circuit 601 is the output of an OR circuit 607.

The output of the OR circuit 601 is the first input of an AND circuit 602. Input as the second input of the AND circuit 602 is the inverted output of the output obtained by performing an OR logical operation on the output of the AND circuit 302 input by the bank #j read of the determination circuit 105 (#1) having the configuration example in FIG. 3, and the output of the AND circuit 302 input by the bank #j write.

The output of the AND circuit 602 is input to a flip-flop circuit 603.

Input as the first input of a NAND circuit 604 is the output obtained by performing an OR logical operation on the output of the AND circuit 302 input by the bank #i read of the determination circuit 105 (#i+2) having the configuration example in FIG. 3, and the output of the AND circuit 302 input by the bank #i write. Input as the second input of the NAND (negative AND) circuit 604 is the inverted output of the output obtained by performing an OR logical operation on the output of the AND circuit 302 input by the bank #j read of the determination circuit 105 (#i+3) having the configuration example in FIG. 3, and the output of the AND circuit 302 input by the bank #j write.

Input as the first input of an AND circuit 605 is the inverted output of the output obtained by performing an OR logical operation on the output of the AND circuit 302 input by the bank #i read of the determination circuit 105 (#i+2) having the configuration example in FIG. 3, and the output of the AND circuit 302 input by the bank #i write. Input as the second input of the AND circuit 605 is the output obtained by performing an OR logical operation on the output of the AND circuit 302 input by the bank #j read of the determination circuit 105 (#i+3) having the configuration example in FIG. 3, and the output of the AND circuit 302 input by the bank #j write.

Input as the first input of an AND circuit 606 is the output of the NAND circuit 604. Input as the second input of the AND circuit 606 is the output of the flipflop circuit 603.

Input as the first input of the OR circuit 607 is the output of the AND circuit 606. Input as the second input of the OR circuit 607 is the output of the AND circuit 605. The output of the OR circuit 607 is the second input of the OR circuit 601.

The output of the flipflop circuit 603 is the output value of a priority control register_ij. When the output value of the flipflop circuit 603 is "0", it indicates that the priority of the REQ_BUF 102 (#i) is higher than the priority of the REQ_BUF 102 (#j). If the output value of the flip-flop circuit 603 is "1", it indicates that the priority of the REQ_BUF 102 (#j) is higher than the priority of the REQ_BUF 102 (#i).

Assume that (ij)=(01). Also assume that a memory request to the bank #0 from the REQ_BUF 102 (#i=#0) is selected in the selector circuit 103, and the output of the AND circuit 302 (FIG. 3) corresponding to the bank #0 from the determination circuit 105 (#1) is "1". As a result, the output of the OR circuit 601 in FIG. 6 is "1". In this case, the output of the AND circuit 302 of the determination circuit 105 (#1) corresponding to another REQ_BUF 102 (#j=#1) is "0". Therefore, the output of the AND circuit 602 is "1", and the flipflop circuit 603 is set to "1". As a result, in the subsequent instruction execution cycles, the output value of the priority control register_01 is "1", and the priority of the REQ_BUF 102 (#i=#0) is lower than the REQ_BUF 102 (#j=#1). The same holds true with another priority control register_ij relating to the REQ_BUF 102 (#i=#0), and the priority of the REQ_BUF 102 (#i=#0) eventually becomes the lowest.

Afterwards, assume that, for example, the determination circuit 105 (#j+2=#3) determines that the memory request of the REQ_BUF 102 (#j=#1) can be executed, and the output of the AND circuit 302 (FIG. 3) corresponding to the bank #1 is "1". On the other hand, assume that the determination circuit 105 (#i+2=#2) determines that the memory request of the REQ_BUF 102 (#i=#0) can be executed, and the output of the AND circuit 302 (FIG. 3) corresponding to the bank #0 is "0". As a result, the output of the AND circuit 605 is "1", and the value is input to the AND circuit 602 through the OR circuits 607 and 601. If the selector circuit 103 remains in the state in which the output of the REQ_BUF 102 (#i=#0) is selected, the output of the AND circuit 302 corresponding to the REQ_BUF 102 (#j=#1) from the determination circuit 105 (#1) remains "0". As a result, the output of the AND circuit 602 is "1", and the output of the flipflop circuit 603 is "1". Therefore, the priority of the REQ_BUF 102 (#j=#1) becomes higher. The same holds true with another priority control register_ij relating to the REQ_BUF 102 (#j=#1), and the priority of the REQ_BUF 102 (#j=#1) eventually becomes the highest. Thus, as a result of determining the access regulation, the operation is performed so that the memory requests which are determined as executable can be selected in order from a memory request from the corresponding REQ_BUF 102 having a higher priority in the priority control register 104 according to the present embodiment.

On the other hand, for example, after the output value of the flipflop circuit 603 becomes 1 in the priority control register_01 by the issue of the memory request from the REQ_BUF 102 (#0), and the priority of the REQ_BUF 102 (#i=#0) becomes lower, the following case is considered. That is, assume that the determination circuit 105 (#i+2=#2) continuously determines the memory request of the REQ_BUF 102 (#i=#0) as executable (for example, as an identical instruction), and the output of the AND circuit 302 (FIG. 3) corresponding to the bank #0 is "1". In this case, assume that the determination circuit 105 (#j+2=#3) determines the memory request of the REQ_BUF 102 (#j=#1) as non-executable, and the output of the AND circuit 302 (FIG. 3) corresponding to the bank #1 is "0". As a result, the output of the NAND circuit 604 is "0", and the output of the AND circuit 606 is "0". On the other hand, the output of the AND circuit 605 is also "0". As a result, the output of the OR circuit 607 is "0". By the change in selection state by the selector circuit 103, it is assumed that the output of the AND circuit 302 (FIG. 3) corresponding to the bank #0 from the determination circuit 105 (#1) has changed to "0". Thus, the output of the OR circuit 601 becomes "0", and the output of the AND circuit 602 also becomes "0", thereby changing the output of the flipflop circuit 603 to "0". Thus, for the REQ_BUF 102 (#0) whose priority has been lowered by issuing a memory request, the operation of enhancing the priority again is performed when an issuable memory request is raised.

As described above, based on the issuability of the memory request from the memory request issuability signal generation unit 106 and the retaining state of the memory request in each REQ_BUF 102 from the determination circuits 105 #2 through #5, the transition state of each priority control register_ij in the priority control register 104 is controlled. Thus, the jump control of a priority according to the access regulations of the DRAM module 109 can be performed. The control can be realized by the simple configuration of the determination circuit 105 #2 through #5 and the simple configuration of the priority control register_ij exemplified in FIG. 6.

Described below are the practical operations according to the embodiment of the memory control device 100 having the configuration illustrated in FIGS. 1 through 6.

Assume that there are one data write request to the bank #0 in the REQ_BUF 102 (#0), one data read request to the bank #1 in the REQ_BUF 102 (#1), and one data write request to the bank #2 in the REQ_BUF 102 (#2). Also assume that the REQ_BUF 102 (#3) holds no memory request, and the control of the priorities is basically in accordance with the LRU (least recently used).

Described below is the case in wich the priority control register 104 indicates the priorities of the REQ_BUF 102 (#0)>REQ_BUF 102 (#1)>REQ_BUF 102 (#2)>REQ_BUF 102 (#3).

First, according to the notification of the REQ_BUF 102 (#0) from the priority control register 104, the selector circuit 103 selects the data write request to the bank #0 read from the REQ_BUF 102 (#0) having the highest priority. According to the memory request issuability signal from the memory request issuability signal generation unit 106, the determination circuit 105 (#1) determines that the data write request to the bank #0 can be issued, and the memory request is issued to the DRAM module 109. In this case, by performing the logical operation on the value held by each priority control register_ij having the configuration example in FIG. 6 in the priority control register 104, the priority of the REQ_BUF 102 (#0) is the lowest. As a result, the priorities are updated as REQ_BUF 102 (#1)>REQ_BUF 102 (#2)>REQ_BUF 102 (#3)>REQ_BUF 102 (#0).

In the next instruction execution cycle, the selector circuit 103 receives the notification of the REQ_BUF 102 (#1) from the priority control register 104, and selects the data read request to the bank #1 read from the REQ_BUF 102 (#1) having the highest priority. In this case, normally regulated is the access regulations that the DRAM module 109 must keep free time for several cycles (for example, 7 cycles) until a data read request is issued after issuing a data write request. Therefore, in 7 cycles, for example, after a data write request is issued immediately before to the bank #0, the output of the determination circuit 105 (#3) is "0" by the information (FIG. 4) of "0" indicating the bank #1 readable according to the memory request issuability signal output by the memory request issuability signal generation unit 106. On the other hand, in the DRAM module 109 there is the regulation that after the issue of a data write request to a band, a data write request to another bank can be continuously issued. Therefore, the information (FIG. 4) indicating the bank #2 writable according to the memory request issuability signal output by the memory request issuability signal generation unit 106 becomes "1" about 2 cycles after the issue of the data write request to the bank #0 issued immediately becomes "1", and the output of the determination circuit 105 (#4) becomes "1". As a result, by the logical operation performed on the value held by each priority control register_ij having the configuration in the priority control register 104 as illustrated in FIG. 6, the priority of the REQ_BUF 102 (#2) becomes the highest. As a result, the priorities are updated to REQ_BUF 102 (#2)>REQ_BUF 102 (#1)>REQ_BUF 102 (#3)>REQ_BUF 102 (#0)

Furthermore, in the next instruction execution cycle, the selector circuit 103 receives the notification of the REQ_BUF 102 (#2) from the priority control register 104, and selects the data read request to the bank #2 read from the REQ_BUF 102 (#2) having the highest priority. Then, the memory request issuability signal output from the determination circuit 105 (#1) is "1" by the information (FIG. 4) of "1" indicating the bank #2 writable according to the memory request issuability signal output by the memory request issuability signal generation unit 106. As a result, a data write request to the bank #2 is issued to the DRAM module 109. Afterwards, the priorities in the priority control register 104 are updated to REQ_BUF 102 (#1)>REQ_BUF 102 (#3)>REQ_BUF 102 (#0)>REQ_BUF 102 (#2).

Then, the selector circuit 103 selects the REQ_BUF 102 (#1). Then, the determination circuit 105 (#1) waits for the information (FIG. 4) of "1" indicating the bank #1 readable according to the memory request issuability signal output from the memory request issuability signal generation unit 106, and the memory request issuability signal of "1" output by the circuit itself. When the memory request issuability signal becomes "1", the determination circuit 105 (#1) issues to the DRAM module 109 a data read request to the bank #1. As a result, the priorities in the priority control register 104 are updated to REQ_BUF 102 (#3)>REQ_BUF 102 (#0)>REQ_BUF 102 (#2)>REQ_BUF 102 (#1).

The operations above are described below further in detail with reference to the timing chart of the operations illustrated in FIGS. 7A and 7B. In this example, assume that the interval from the issue of the data write request to the issuable state of the data read request is 7 cycles, and the interval from the issue of the data write request to the issuable state of the data write request relating to a different bank is 2 cycles.

Figure 7A:
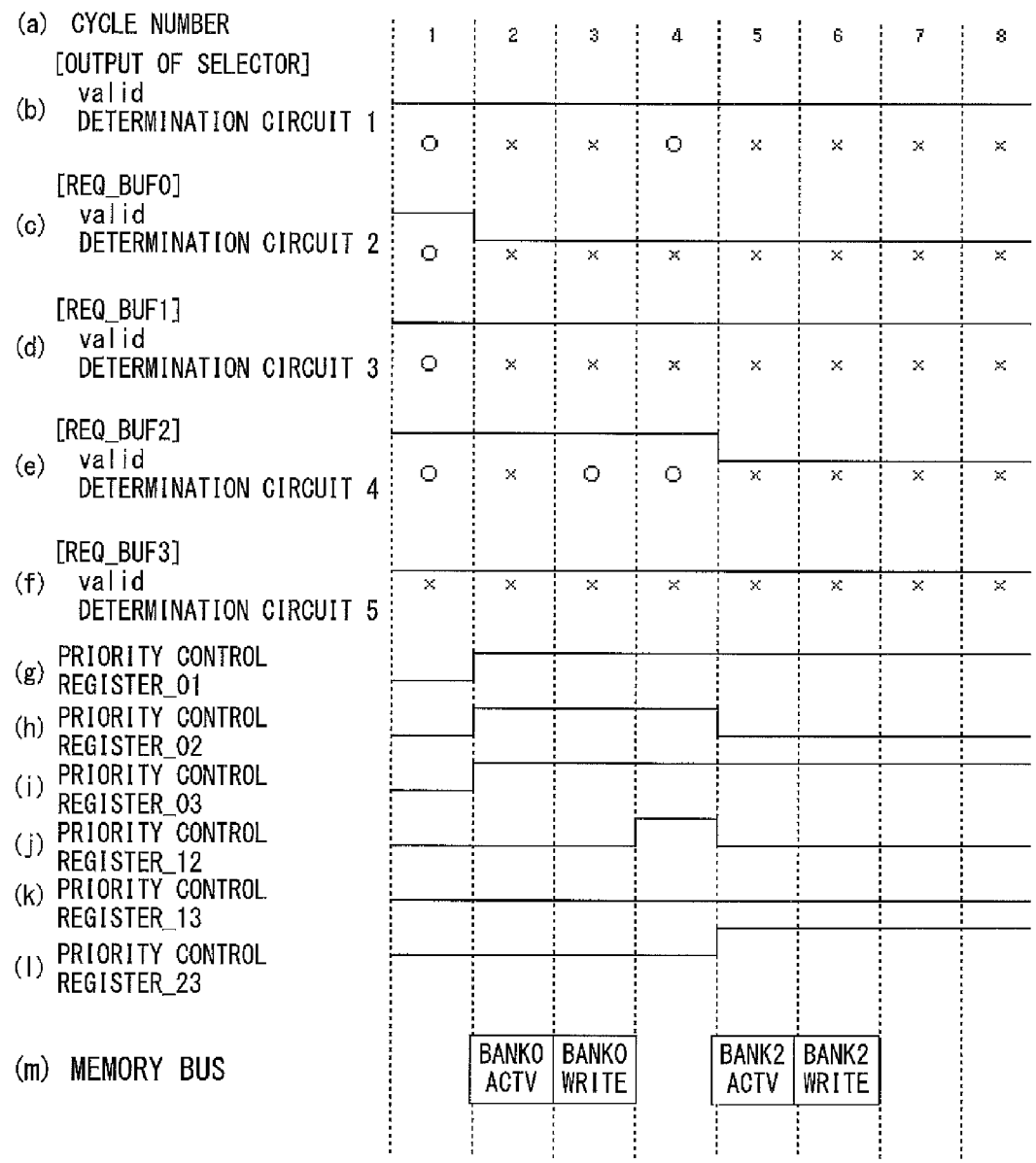
FIGS. 7A and 7B are a flowchart of the operation of an embodiment.
Figure 7B:
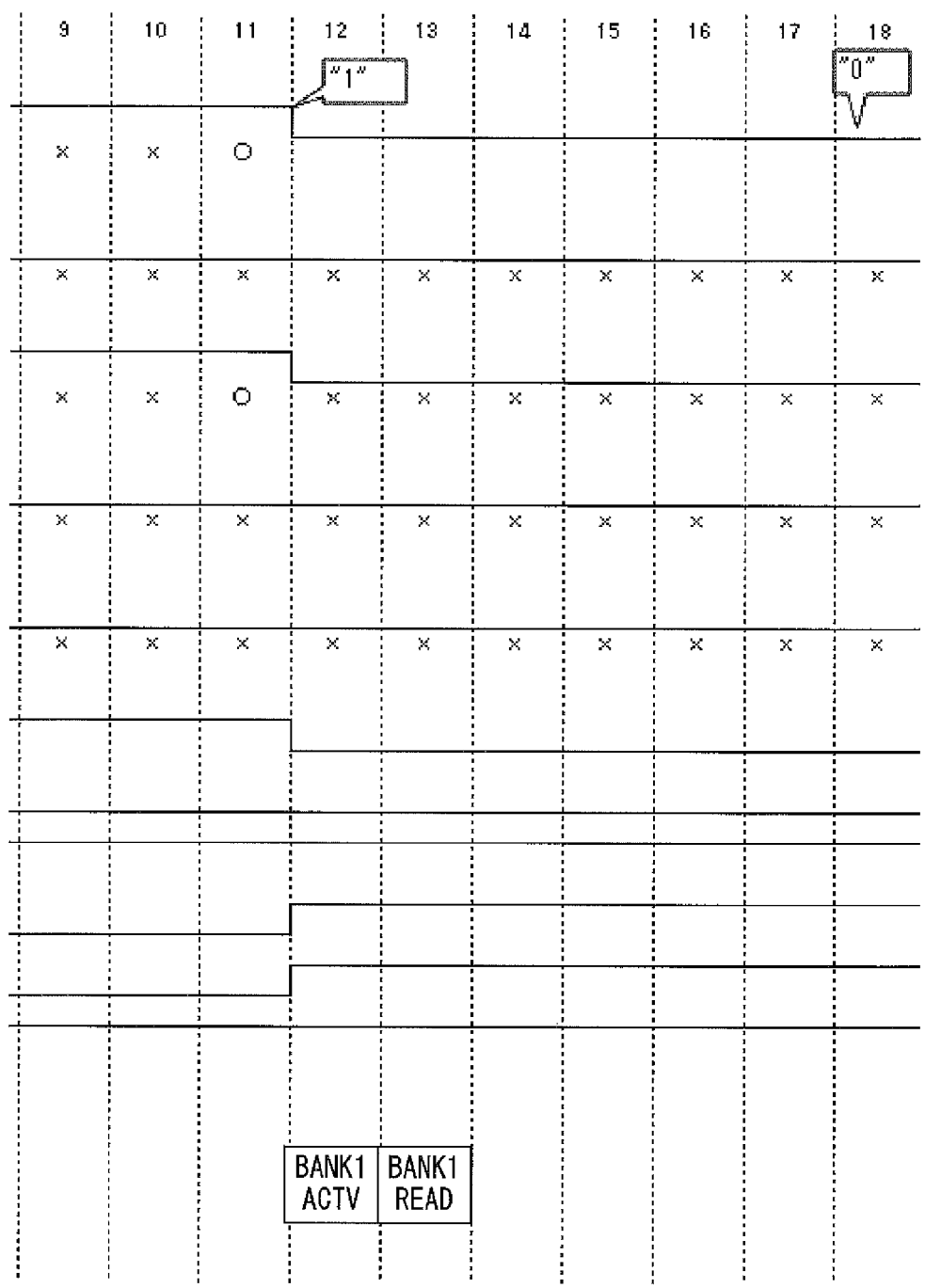

The "valid" in (b) through (f) in FIGS. 7A and 7B refers to a valid signal indicating that there is a valid request when it is "1", and there is no valid request or the held request is invalid when it is "0". In the output of each of the determination circuits 105 #1 through #5 in (b) through (f) illustrated in FIGS. 7A and 7B, when it is determined that a memory request from the corresponding REQ_BUF 102 can be issued, it is marked with "○", and when it is determined the request cannot be issued, it is marked with "X".

According to the embodiment above, the selector circuit 103 selects the REQ_BUF 102 (#0), and the determination circuit 105 (#1) determines that the memory request from the REQ_BUF 102 (#0) can be issued in the instruction execution cycle of the cycle number 1 (FIG. 7A (b), (c)). Therefore, the determination circuit 105 (#1) issues to the DRAM module 109 the data write request to the bank #0 in each of the instruction execution cycles of the cycle number 2 and 3 (FIG. 7A (m)).

In the instruction execution cycle of the cycle number 2, the priority control register_01, the priority control register_02, and the priority control register_03 are updated to "1", and the priority of the REQ_BUF 102 (#0) becomes the lowest.

In the instruction execution cycle of the cycle number 3, the determination circuit 105 (#1) determines "not issuable" (FIG. 7A (b)), and the determination circuit 105 (#4) determines "issuable" (FIG. 7A (e)). Therefore, in the instruction execution cycle of the cycle number 4, the priority control register_12 is updated to "1", and the priority of the REQ_BUF 102 (#2) becomes the highest.

As a result, in the instruction execution cycle of the cycle number 4, the selector circuit 103 selects the memory request from the REQ_BUF 102 (#2). The memory request is determined as issuable by the determination circuit 105 (#1) (FIG. 7A (b)). As a result, in the instruction execution cycles from the cycle number 5 to the cycle number 6, a data write request to the bank #2 is issued to the DRAM module 109 (FIG. 7A (m)).

In the cycle number 5, the priority control register_02 and the priority control register_12 are updated to "0", and the priority control register_23 is updated to "1", and the priority of the REQ_BUF 102 (#2) becomes the lowest.

In the instruction execution cycles from the cycle number 5 to the cycle number 11, the selector circuit 103 selects the REQ_BUF 102 (#1). Then, in the instruction execution cycle of the cycle number 11, the determination circuit 105 (#1) determines that the memory request from the REQ_BUF 102 (#1) can be issued. Therefore, in the instruction execution cycles of the cycle numbers 12 and 13, the data read request to the bank #1 is issued (FIG. 7B (m)).

In the instruction execution cycle of the cycle number 12, the priority control register_01 is updated to "0", and the priority control register_12 and the priority control register_13 are updated to "1".

In the embodiment above, the memory control device 100 and the DRAM module 109, and the bus connecting them to each other can be efficiently used.

Figure 8B:
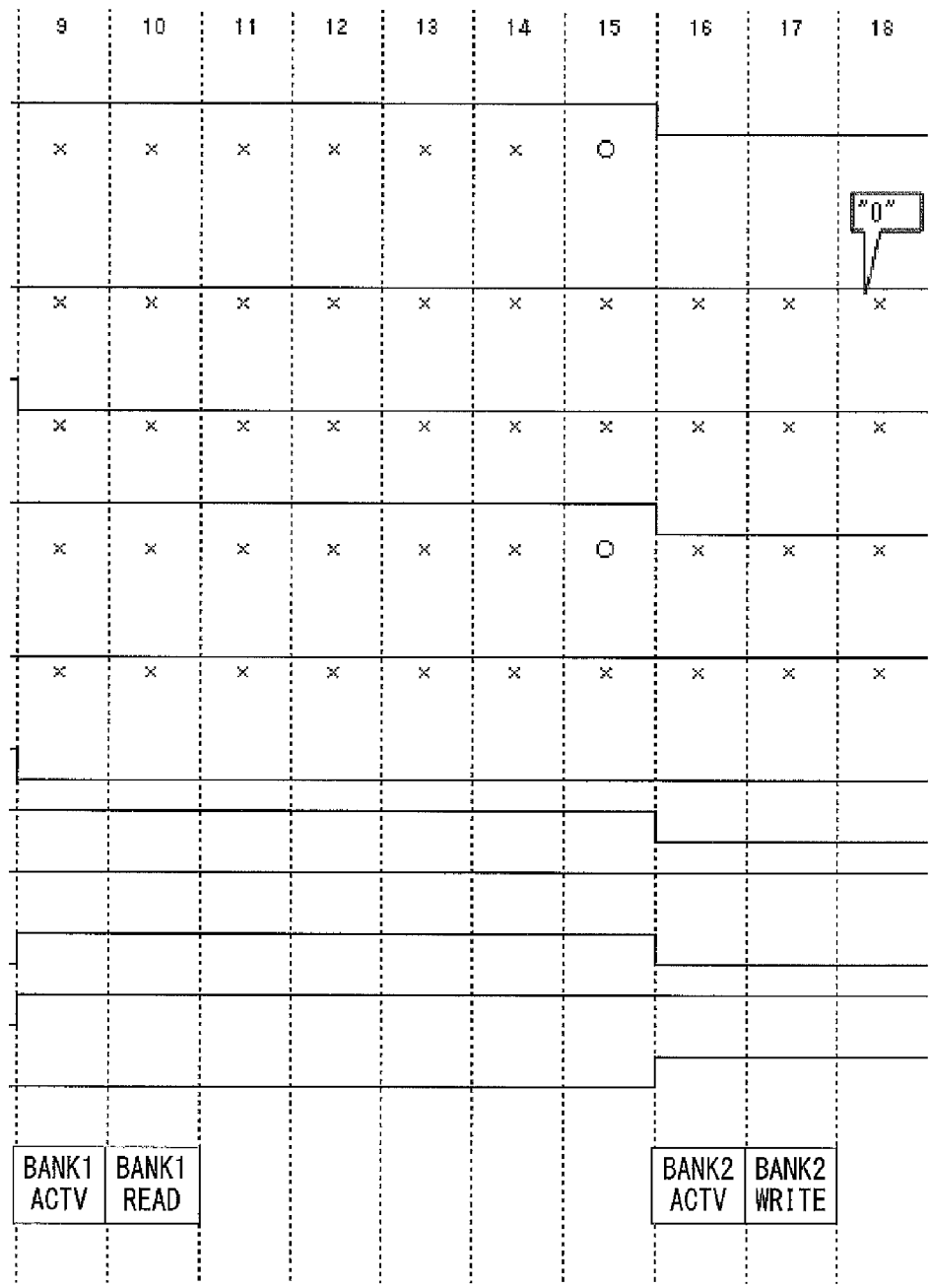

FIGS. 8A and 8B are a timing chart of the operation performed when the memory control device is controlled by the priority control without considering the access regulation of the DRAM module 109. As described above with reference to FIGS. 7A and 7B, after the issue of the data write request to the bank #0, the REQ_BUF 102 (#2) holds the data read request to the bank #2 to be executable every two instruction execution cycles. However, in FIGS. 8A and 8B, the data read request to the bank #2 becomes executable 7 cycles after the issuing of the data write request to the bank #0. Thus, it is obvious that the present embodiment is advantageous.

Figure 9:
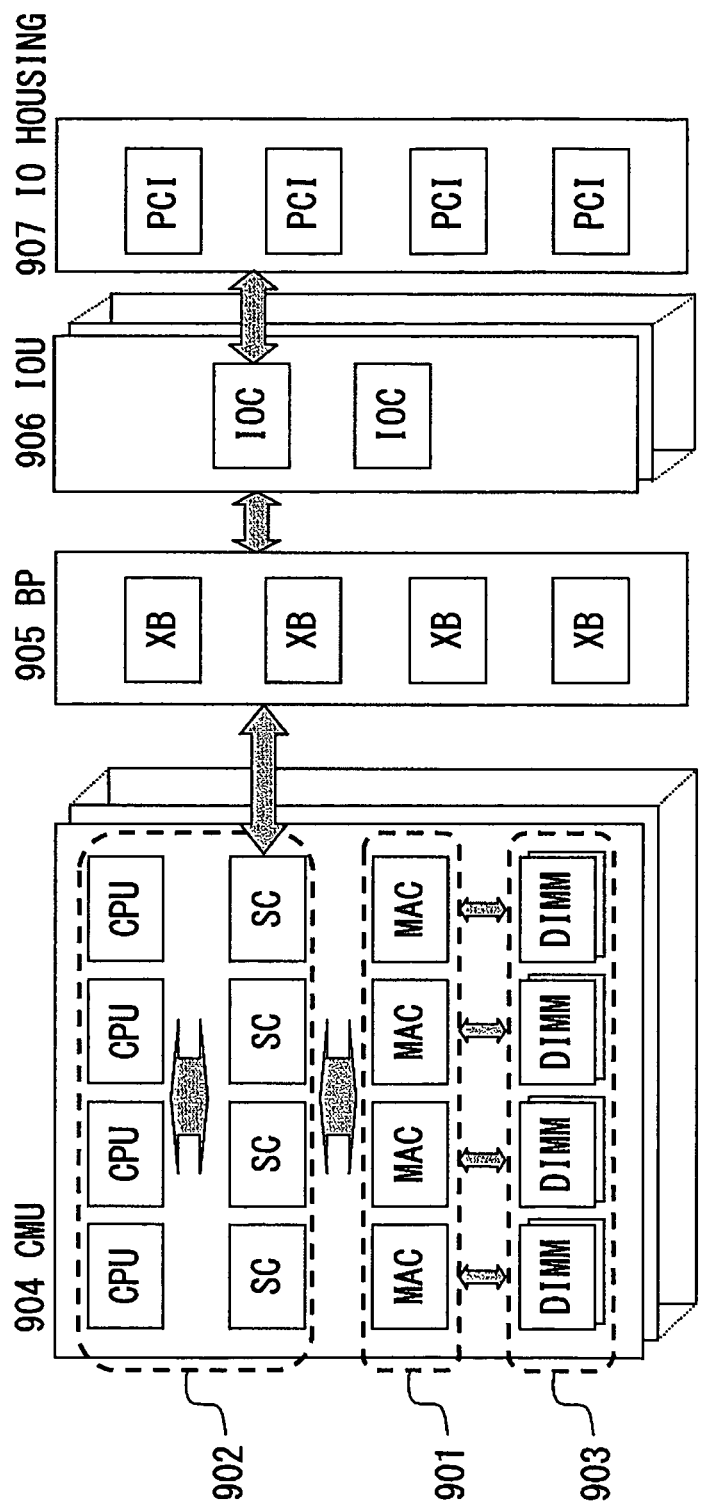
FIG. 9 is an example of a configuration of the computer system according to an embodiment.

FIG. 9 is an example of a configuration of the computer system to which the embodiment having the configuration in FIG. 1 can be applied. In FIG. 9, in a control device 904 called a CMU (CPU memory unit), a memory access controller (MAC) 901 corresponding to the memory control device 100 in FIG. 1 is arranged. The MAC 901 controls the priorities of the memory requests issued from a CPU 902 (corresponding to the CPU 107 in FIG. 1) to a dual inline memory module (DIMM) 903 (corresponding to the DRAM module 109 in FIG. 1). The MAC 901 also controls the priorities of the memory requests to the DIMM 903 which are input from the input/output device in IO housing 907 (corresponding to the IO device 108 in FIG. 1) through an input/output unit (IOU) 906 and a back plane (BP) 905.

What is claimed is:

1. A memory control device which is coupled to a processor and a storage device having first memory bank and a second memory bank corresponding to the first memory bank, and which issues a memory access request received from the processor to the storage device, the memory control device comprising:
    a first request storage unit configured to hold a first memory access request to the first memory bank;
    a second request storage unit configured to hold a second memory access request to the second memory bank;
    a decode unit configured to allocate, to the first request storage unit or the second request storage unit, each of the first memory access request and the second memory access request received from the processor based on a bank address included in the each of the first memory access request and the second memory access request;
    a selection unit connected to the first request storage unit and the second request storage unit and configured to select and output the first memory access request held in the first request storage unit or the second memory access request held in the second request storage unit as a selected memory access request based on a selection signal;
    a first determination circuit configured to output a first determination result as to whether the first memory access request held in the first request storage unit can be issued to the first memory bank depending on a relationship with a first issued memory access request already issued to the first memory bank;
    a second determination circuit configured to output a second determination result as to whether the second memory access request held in the second request storage unit can be issued to the second memory bank depending on a relationship with a second issued memory access request already issued to the second memory bank;
    a third determination circuit configured to output a third determination result as to whether the selected memory access request can be issued to the storage device depending on a relationship with an issued memory access request already issued to the storage device; and
    a priority control circuit connected to the first determination circuit and the second determination circuit, configured to output the selection signal according to priorities held by a priority control register, and configured to update the priorities held by the priority control register according to the first determination result through the third determination result.

2. The memory control device according to claim 1, wherein the priority control circuit lowers the priority of the memory access request held in a last selected request storage unit between the first request storage unit and the second request storage unit when memory access corresponding to a last selected memory access request is completed, and enhances the priority of the request storage unit which has output a determination result when the determination result that the first determination result through the third determination result cannot be issued to the first memory bank or the second memory bank from any of the first determination circuit through the third determination circuit is received.

3. The memory control device according to claim 1, wherein:
    the memory control device is further connected to an input/output control device; and
    the decode unit further allocates to the first request storage unit or the second request storage unit the memory access request received from the input/output control device in addition to the memory access request received from the processor depending on the bank address included in the memory access request.

4. The memory control device according to claim 1, wherein the first request storage unit and the second request storage unit are first in first out buffers.

5. An information processing device comprising:
    a processor;
    a storage device having a first memory bank and a second memory bank corresponding to the first memory bank; and
    a memory control device coupled to the storage device, wherein the memory control device comprises:
        a first request storage unit configured to hold a first memory access request to the first memory bank;
        a second request storage unit configured to hold a second memory access request to the second memory bank;
        a decode unit configured to allocate, to the first request storage unit or the second request storage unit, each of the first memory access request and the second memory access request received from the processor based on a bank address included in the each of the first memory access request and the second memory request;
        a selection unit connected to the first request storage unit and the second request storage unit and configured to select and output the first memory access request held in the first request storage unit or the second memory access request held in the second request storage unit as a selected memory access request based on a selection signal;

a first determination circuit configured to output a first determination result as to whether the first memory access request held in the first request storage unit can be issued to the first memory bank depending on a relationship with a first issued memory access request already issued to the first memory bank;

a second determination circuit configured to output a second determination result as to whether the second memory access request held in the second request storage unit can be issued to the second memory bank depending on a relationship with a second issued memory access request already issued to the second memory bank;

a third determination circuit configured to output a third determination result as to whether the selected memory access request can be issued to the storage device depending on a relationship with an issued memory access request already issued to the storage device; and a priority control circuit connected to the first determination circuit and the second determination circuit, configured to output the selection signal according to priorities held by a priority control register, and configured to update the priorities held by the priority control register according to the first determination result through the third determination result.

6. The information processing device according to claim 5, wherein the priority control circuit lowers the priority of the memory access request held in a last selected request storage unit between the first request storage unit and the second request storage unit when memory access corresponding to a last selected memory access request is completed, and enhances the priority of the request storage unit which has output a determination result when the determination result that the first determination result through the third determination result cannot be issued to the first memory bank or the second memory bank from any of the first determination circuit through the third determination circuit is received.

7. The information processing device according to claim 5, wherein:
the memory control device is further connected to an input/output control device; and
the decode unit further allocates to the first request storage unit or the second request storage unit the memory access request received from the input/output control device in addition to the memory access request received from the processor depending on the bank address included in the memory access request.

8. The information processing device according to claim 5, wherein the first request storage unit and the second request storage unit are first in first out buffers.

9. A control method for a memory control device which is connected to a processor and a storage device having a first memory bank and a second memory bank corresponding to the first memory bank, and which issues a memory access request received from the processor to the storage device, the control method comprising:

holding a first memory access request to the first memory bank by using a first request storage unit of the memory control device;

holding a second memory access request to the second memory bank by using a second request storage unit of the memory control device;

allocating, to the first request storage unit or the second request storage unit, each of the first memory access request and the second memory access request received from the processor based on a bank address included in the each of the first memory access request and the second memory access request by using a decode unit of the memory control device;

selecting and outputting the memory access request held in the first request storage unit or the second memory access request held in the second request storage unit as a selected memory access request based on a selection signal by using a selection unit of the memory control device connected to the first request storage unit and the second request storage unit;

outputting a first determination result as to whether the first memory access request held in the first request storage unit can be issued to the first memory bank depending on a relationship with a first issued memory access request already issued to the first memory bank by using a first determination circuit of the memory control device;

outputting a second determination result as to whether the second memory access request held in the second request storage unit can be issued to the second memory bank depending on a relationship with a second issued memory access request already issued to the second memory bank by using a second determination circuit of the memory control device;

outputting a third determination result as to whether the selected memory access request can be issued to the storage device depending on a relationship with an issued memory access request already issued to the storage device by using a third determination circuit of the memory control device;

outputting the selection signal according to priorities held by a priority control register by using a priority control circuit of the memory control device connected to the first determination circuit and the second determination circuit; and updating the priorities held by the priority control register according to the first determination result through the third determination result by using the priority control circuit.

10. The control method for the memory control device according to claim 9, wherein the priority control circuit lowers the priority of the memory access request held in a last selected request storage unit between the first request storage unit and the second request storage unit when memory access corresponding to a last selected memory access request is completed, and enhances the priority of the request storage unit which has output a determination result when the determination result that the first determination result through the third determination result cannot be issued to the first memory bank or the second memory bank from any of the first determination circuit through the third determination circuit is received.

* * * * *